(12) United States Patent  
Li

(10) Patent No.: US 10,817,038 B2
(45) Date of Patent: Oct. 27, 2020

(54) DATA COMMUNICATION DEVICE AND SYSTEM

(71) Applicant: TENDYRON CORPORATION, Beijing (CN)

(72) Inventor: Dongsheng Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 71 days.

(21) Appl. No.: 16/333,212

(22) PCT Filed: Sep. 1, 2017

(86) PCT No.: PCT/CN2017/100211
§ 371 (c)(1),
(2) Date: Mar. 13, 2019

(87) PCT Pub. No.: WO2018/049993
PCT Pub. Date: Mar. 22, 2018

(65) Prior Publication Data
US 2019/0227610 A1 Jul. 25, 2019

(30) Foreign Application Priority Data

Sep. 14, 2016 (CN) .......................... 2016 1 0827226
Sep. 14, 2016 (CN) .......................... 2016 1 0827236
Sep. 14, 2016 (CN) .......................... 2016 1 0827245
Sep. 14, 2016 (CN) .......................... 2016 1 0827251

(51) Int. Cl.
G06F 1/26 (2006.01)
G06F 13/40 (2006.01)
H02J 7/34 (2006.01)

(52) U.S. Cl.
CPC .............. *G06F 1/266* (2013.01); *G06F 13/40* (2013.01); *G06F 13/4063* (2013.01); *H02J 7/345* (2013.01)

(58) Field of Classification Search
CPC ....... G06F 1/266; G06F 13/40; G06F 13/4063
See application file for complete search history.

(56) References Cited

U.S. PATENT DOCUMENTS 7,606,955 B1 * 10/2009 Falik .................. G06F 13/4295
709/230
7,826,402 B2 * 11/2010 Lin ..................... G06F 13/4072
370/282
9,128,691 B2 9/2015 Liu
10,169,278 B2 * 1/2019 Mori .................. G06F 13/4072

FOREIGN PATENT DOCUMENTS

CN 103064489 A 4/2013
CN 104678158 A 6/2015

* cited by examiner

Primary Examiner — Stefan Stoynov
(74) Attorney, Agent, or Firm — BakerHostetler

(57) ABSTRACT

The present disclosure provides a data communication device and a data communication system. The data communication device includes a power supply interface coupled to a direct current power supply, a wired communication interface, a main control chip, and an energy storage component. The data communication system includes a master communication device and a slave communication device.

15 Claims, 8 Drawing Sheets

DATA COMMUNICATION DEVICE AND SYSTEM

CROSS-REFERENCE TO RELATED APPLICATIONS

This application is a U.S. national phase of International Application No. PCT/CN2017/100211, filed on Sep. 1, 2017, which claims priority to following applications: Chinese Patent Application No. 201610827236.1, filed with National Intellectual Property Administration of P. R. China on Sep. 14, 2016, titled with "data communication device", and filed by TENDYRON CORPORATION; Chinese Patent Application No. 201610827251.6, filed with National Intellectual Property Administration of P. R. China on Sep. 14, 2016, titled with "data communication device", and filed by TENDYRON CORPORATION; Chinese Patent Application No. 201610827245.0, filed with National Intellectual Property Administration of P. R. China on Sep. 14, 2016, titled with "data communication system", and filed by TENDYRON CORPORATION; and Chinese Patent Application No. 201610827226.8, filed with National Intellectual Property Administration of P. R. China on Sep. 14, 2016, titled with "data communication system", and filed by TENDYRON CORPORATION.

FIELD

The present invention relates to the field of electronic technologies, and more particularly, to a data communication device and a data communication system.

BACKGROUND

At present, electronic products are developing rapidly, and there are a variety of external interfaces. For products with main chips, there are generally external interfaces, having charging and communication functions. At present, generally, in the wired communication interface of electronic products, the charging interface and the wired communication interface are separated, in other words, different signal lines are used to realize communication and charging, at least three lines are required, and a lot of hardware support is needed, which wastes resources. As the continuous improvement of product comfort, interface communication that is convenient for users and not limited to forward and inverting will be more and more important.

SUMMARY

An aspect of the present disclosure provides a data communication device which may be configured as a master device. The device includes a power supply interface coupled to a direct current power supply, a wired communication interface, a main control chip, and an energy storage component. The wired communication interface includes a first communication sub interface and a second communication sub interface. The power supply interface is electrically coupled to a first end of the energy storage component and the first communication sub interface, respectively. The first communication sub interface is electrically coupled to the first end of the energy storage component. The second communication sub interface is electrically coupled to a ground end of the data communication device. The main control chip includes a control port, and the control port is electrically coupled to a second end of the energy storage component. The main control chip is configured to output a first signal through the control port when the data communication device sends a low level signal. The energy storage component is configured to set a voltage of the first end of the energy storage component as a first voltage value under control of the first signal. The first voltage value is less than a voltage value at the power supply interface and greater than zero.

Another aspect of the present disclosure further provides a data communication device which may be configured as a slave device. The device includes a wired communication interface, an anti-reverse connection module, a main control chip, and a signal collection circuit. The wired communication interface includes a first communication sub interface and a second communication sub interface. The first communication sub interface is electrically coupled to a first input/output end of the anti-reverse connection module, and the second communication sub interface is electrically coupled to a second input/output end of the anti-reverse connection module. A ground end of the anti-reverse connection module is electrically coupled to a ground end of the data communication device, and an output end of the anti-reverse connection module is electrically coupled to an input end of the signal collection circuit. The main control chip includes a detection port, and the detection port is electrically coupled to an output end of the signal collection circuit. The signal collection circuit includes a first load component, a second load component, a capacitor component, a third load component, and a voltage comparator. A first end of the first load component is electrically coupled to a first end of the second load component. A connection point between the first load component and the second load component forms the input end of the signal collection circuit. A second end of the first load component is electrically coupled to a forward input end of the voltage comparator. A second end of the second load component, a first end of the capacitor component and a first end of the third load component are electrically coupled to an inverting input end of the voltage comparator, respectively. A second end of the capacitor component and a second end of the third load component are electrically coupled to the ground end, respectively. An output end of the voltage comparator forms the output end of the signal collection circuit. The anti-reverse connection module is configured to power on a path from one of the first input/output end and the second input/output end to the output end of the anti-reverse connection module, and power on a path from the ground end to the other one of the first input/output end and the second input/output end.

Yet another aspect of the present disclosure provides a data communication system. The system includes a master communication device and a slave communication device. The master communication device includes a power supply interface, a first wired communication interface, a first energy storage component, and a first main control chip. The power supply interface is coupled to a direct current power supply. The first wired communication interface includes a first communication sub interface and a second communication sub interface. The first communication sub interface is electrically coupled to the power supply interface, and the second communication sub interface is electrically coupled to a ground end of the master communication device. A first end of the first energy storage component is electrically coupled to a connection point between the first communication sub interface and the power supply interface. The first main control chip includes a control port, and the control port is electrically coupled to a second end of the first energy storage component. The first main control chip is configured to output a first signal through the control port when the master communication device sends a low level signal. The first energy storage component is configured to set a voltage of the first end of the first energy storage component as a first voltage value under control of the first signal. The first voltage value is less than a voltage value at the power supply interface and greater than zero. The slave communication device includes a second wired communication interface, an anti-reverse connection module, a second main control chip, and a second signal collection circuit. The second wired communication interface includes a first communication sub interface of the slave communication device and a second communication sub interface of the slave communication device. The anti-reverse connection module includes a first input/output end, a second input/output end, a ground end, and an output end. The first input/output end is electrically coupled to the first communication sub interface of the slave communication device. The second input/output end is electrically coupled to the second communication sub interface of the slave communication device. The ground end is electrically coupled to the ground end of the slave communication device. The output end of the anti-reverse connection module is electrically coupled to an input end of the second signal collection circuit. The anti-reverse connection module is configured to power on a path from one of the first input/output end and the second input/output end to the output end of the anti-reverse connection module, and power on a path from the ground end to the other one of the first input/output end and the second input/output end. The second main control chip includes a detection port, and the detection port is electrically coupled to an output end of the second signal collection circuit. The second signal collection circuit includes a first load component, a second load component, a capacitor component, a third load component, and a voltage comparator. A first end of the first load component is electrically coupled to a first end of the second load component, and a connection point between the first load component and the second load component forms the input end of the second signal collection circuit. A second end of the first load component is electrically coupled to a forward input end of the voltage comparator. A second end of the second load component, a first end of the capacitor component and a first end of the third load component are electrically coupled to an inverting input end of the voltage comparator, respectively. A second end of the capacitor component and a second end of the third load component are electrically coupled to the ground end, respectively. An output end of the voltage comparator forms the output end of the second signal collection circuit.

BRIEF DESCRIPTION OF THE DRAWINGS

To describe the technical solutions in the embodiments of the present disclosure more clearly, the accompanying drawings required for describing the embodiments are introduced briefly in the following. Obviously, the accompanying drawings in the following description are only some embodiments of the present disclosure, and persons of ordinary skill in the art may also derive other drawings from these accompanying drawings without creative efforts.

DETAILED DESCRIPTION

The technical solutions in the embodiments of the present disclosure will be clearly and completely described in the following with reference to the accompanying drawings in the embodiments of the present disclosure. Obviously, the embodiments in the following description are merely a part rather than all of the embodiments of the present disclosure. Based on the embodiments of the present disclosure, all other embodiments obtained by persons of ordinary skill in the art without creative efforts shall fall within the protection scope of the present disclosure.

Embodiments of the present disclosure will be described in detail below with reference to the accompany drawings.

The embodiment provides a data communication device configured for a master communication (referred to as a master device) and a data communication device configured for a slave communication (referred to as a slave device). The master device may communicate with the slave device communicate via a two-wire communication interface. When the master communication device is coupled to the slave communication device in a forward direction via the two-wire communication interface, it indicates that a first communication sub interface of the master device is electrically coupled to a first communication sub interface of the slave device, and a second communication sub interface of the master device is electrically coupled to a second communication sub interface of the slave device. The master device may transmit data to the slave device through the first communication sub interface, or receive data from the slave device. Furthermore, the master device may provide a power supply voltage to the slave device. The slave device may transmit data to the master device through the first communication sub interface, or receive data from the master device. The master device and the slave device will be introduced in detail below.

Embodiment 1

Figure 1:
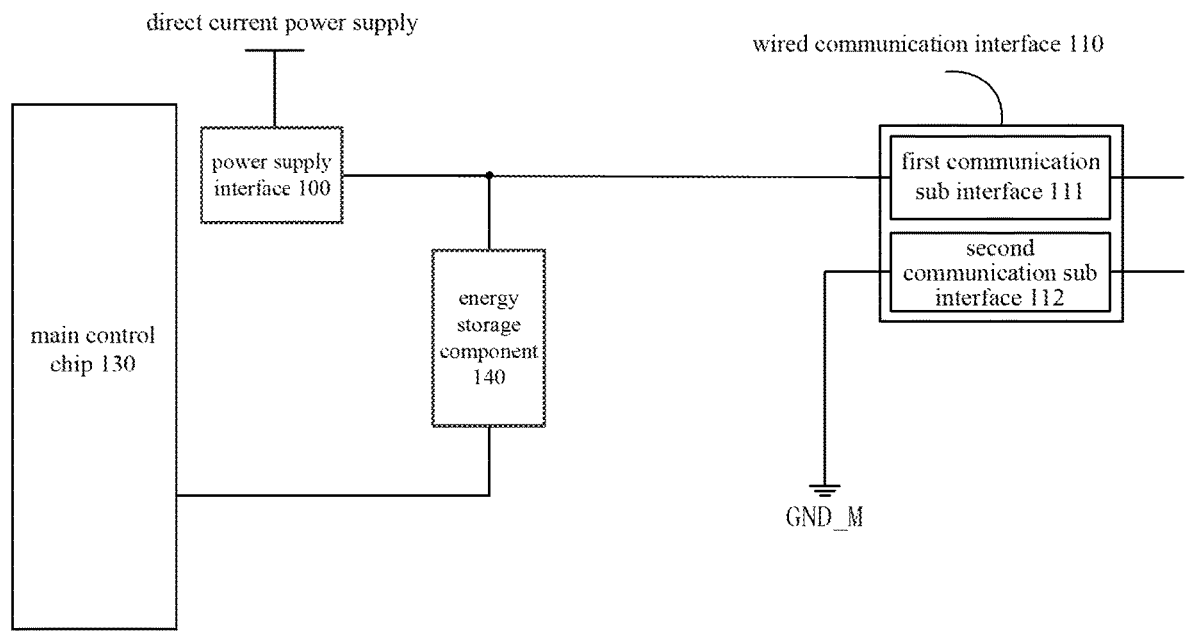
FIG. 1 is a schematic diagram of a data communication device configured as a master device according to Embodiment 1 of the present disclosure.

The embodiment provides a data communication device, which may be configured as a master device. As illustrated in FIG. 1, the data communication device includes a power supply interface 100 coupled to a direct current power supply, a wired communication interface 110, a main control chip 130, and an energy storage component 140.

The wired communication interface 100 includes a first communication sub interface 111 and a second communication sub interface 112.

The power supply interface 100 is electrically coupled to a first end of the energy storage component 140 and the first communication sub interface 111, respectively.

The first communication sub interface 111 is electrically coupled to the first end of the energy storage component 140.

The second communication sub interface 112 is electrically coupled to a ground end GND_M of the data communication device.

The main control chip 130 includes a control port, and the control port is electrically coupled to a second end of the energy storage component 140.

The main control chip 130 is configured to output a first signal through the control port when the data communication device sends a low level signal.

The energy storage component 140 is configured to set a voltage of the first end of the energy storage component 140 as a first voltage value under control of the first signal. The first voltage value is less than a voltage value at the power supply interface and greater than zero.

The wired communication interface 100 is composed of the first communication sub interface 111 and the second communication sub interface 112. Since the wired communication interface is composed of two lines, the wired communication interface may also be called a two-wire communication interface.

In the embodiment, since the first communication sub interface of the data communication device is electrically coupled to the power supply interface, the level at the first communication sub interface can be maintained at the voltage value of the power supply interface when there is no transmission of the low level signal. When the data communication device sends the low level signal, the main control chip outputs the first signal through the control port, the energy storage component sets the voltage of the first end of the energy storage component as the first voltage value under the control of the first signal. Since the first voltage value is less than the voltage value at the power supply interface and greater than zero, the level at the first communication sub interface is decreased to generate a level change, such that data transmission is achieved by the level change at the first communication sub interface, rather than adopting the scheme in the related art to achieve data transmission by grounding the level of the transmit port to zero.

In an alternative implementation of the embodiment, the power supply interface 100 may be electrically coupled to a power supply port of the main control chip 130, to supply power to the main control chip 130. Certainly, the power supply interface 100 may also be electrically coupled to the power supply port of other load components in the data communication device, so as to supply power to the load components in the data communication device.

As an alternative implementation of embodiments of the present disclosure, the data communication device may further include a current stabilizing component (not shown). The current stabilizing component is coupled between the power supply interface and the first end of the energy storage component. Moreover, the current stabilizing component is located between the power supply interface and the first communication sub interface, and the current stabilizing component is also located between the power supply interface and the input end of the signal collection circuit. In an implementation, as an alternative manner, the current stabilizing component may include an inductor component. By utilizing characteristics of the inductor, the current stabilizing component can ensure that there is no sudden change in the current of the circuit.

Furthermore, as an alternative implementation of embodiments of the present disclosure, the data communication device further includes a freewheeling component (not shown). The freewheeling component is reversely connected in parallel across the inductor. The freewheeling component is conductive in one direction, and the conduction direction is opposite to that of the circuit path in the inductor. In an implementation, as an alternative manner, the freewheeling component may be a diode or other freewheeling component, which is not limited in the embodiment. Taking the diode as an example, the anode of the diode may be taken as a first end, and the cathode of the diode may be taken as a second end, i.e., the diode is reversely connected in parallel across the inductor. When the circuit is unstable, the electromotive force across both ends of the inductor in the current stabilizing component does not disappear immediately, the wave crest or wave trough of the waveform may oscillate (with glitch), and the residual electromotive force may produce a reverse voltage to components in the circuit and then may burn the components. While the diode connected in anti-parallel at both ends of the inductor can release the residual electromotive force (the diode that plays this role is called the freewheeling diode), thereby ensuring the safety of other components in the circuit. Further, the freewheeling component can eliminate oscillation of the fast falling edge (i.e., obtaining a smooth waveform), to output a smooth voltage (high level or low level).

Embodiment 2

Embodiments of the present disclosure provide a data communication device, which may be configured as a master device. The embodiment may have the following differences from Embodiment 1.

In this embodiment, the main control chip is configured to output a second signal through the control port when the data communication device sends a high level signal.

In this embodiment, the first signal is a level signal having a voltage value less than a second voltage value. The second voltage value is less than the voltage value at the power supply interface. The second signal is a level signal having a voltage value equal to the second voltage value.

Figure 2:
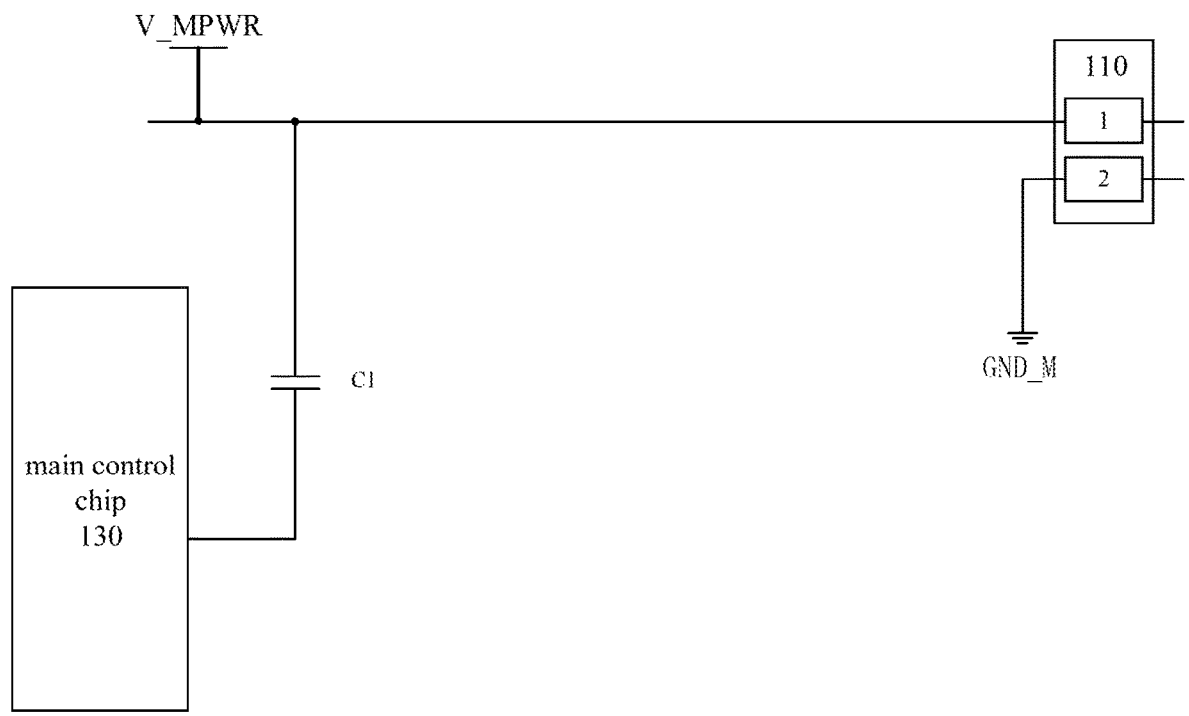
FIG. 2 is a schematic diagram of a data communication device configured as a master device according to Embodiment 2 of the present disclosure.

As illustrated in FIG. 2, the energy storage component may be a capacitor (C1 shown in FIG. 2). The first end of the energy storage component is electrically coupled to the power supply interface (V_MPWR shown in FIG. 2) and the first communication sub interface (in FIG. 2, 1 in 110 denotes the first communication sub interface, and 2 in 110 denotes the second communication sub interface), respectively, and the second end of the energy storage component is electrically coupled to the control port of the main control chip 130.

When the data communication device sends the high level signal, since the first end of the energy storage component can be maintained at the voltage provided by the power supply interface, the level of the first communication sub interface may also be maintained at the high level signal, and the high level signal is the voltage signal provided by the power supply interface. The main control chip can output the second signal through the control port, such that the value of the level of the second end of the energy storage component can be maintained at the second voltage value. The second signal is the level signal having the voltage value equal to the second voltage value, and the second voltage value is lower than the voltage value at the power supply interface. For example, the voltage value at the power supply interface is 5 v, and the second voltage value may be 3 v. In the embodiment, the second signal may have functions of maintaining the voltage difference across both ends of the energy storage component at a difference between the voltage value of the power supply interface and the second voltage value, when the low level signal needs to be sent next time, and the main control chip outputs the first signal having the voltage value less than the second voltage value through the control port, the voltage difference across both ends of the energy storage component may be increased, causing the capacitor to be charged instantaneously. Based on the characteristics of blocking DC and delivering AC of the capacitor, the level of the first end of the energy storage component is instantaneously pulled down, such that the level of the first communication sub interface is pulled down, thereby achieving transmission of the low level signal.

When the data communication device sends the low level signal, the main control chip may output the first signal through the control port, the first signal is the level signal having the voltage value less than the second voltage value, for example, the second voltage value is 3 v, the voltage value of the first signal may be 2 v, or 1 v, or 0 v, etc., the voltage difference across both ends of the capacitor may be increased, such that the capacitor is instantaneously charged. Based on the characteristics of blocking DC and delivering AC of the capacitor, the level of the first end of the capacitor is instantaneously pulled down, such that the level of the first communication sub interface is pulled down, thereby generating a level change to achieve data transmission. With the capacitor, the voltage value of the level at the first communication sub interface can be controlled to drop to the first voltage value (the first voltage value is non-zero), thereby achieving data transmission, rather than adopting the scheme in the related art to achieve data transmission by grounding the level of the transmit port to zero.

In an alternative implementation of the embodiment, an implementation manner of the control port outputting the first signal may be: generating the first signal internally by the main control chip, and outputting it through the control port. Alternatively, another implementation manner of the control port outputting the first signal may be: the control port controls the second end of the energy storage component to be grounded by controlling on/off of a switch, so as to generate the first signal at the control port. In this case, the device further includes a switch component (not shown). The control port is electrically coupled to the second end of the energy storage component through the switch component. The switch component is electrically coupled to the ground end, and the control port is configured to power on a path between the second end of the energy storage component and the ground end when the data communication device sends the low level signal.

Figure 3:
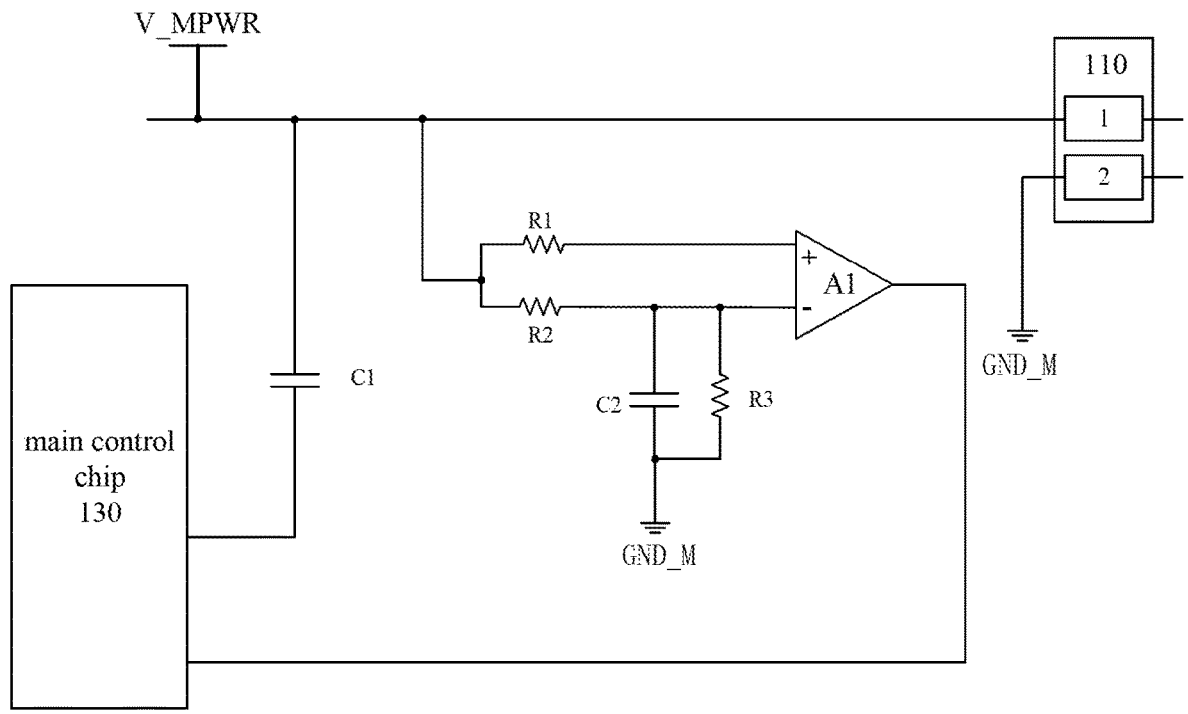
FIG. 3 is another schematic diagram of a data communication device configured as a master device according to Embodiment 2 of the present disclosure.

In an alternative implementation of the embodiment, as illustrated in FIG. 3, the signal collection circuit includes a first load component (R1 shown in FIG. 3), a second load component (R2 shown in FIG. 3), a capacitor component (C2 shown in FIG. 3), a third load component (R3 shown in FIG. 3), and a voltage comparator (A1 shown in FIG. 3). A first end of the first load component is electrically coupled to a first end of the second load component, and a connection point between the first load component and the second load component forms the input end of the signal collection circuit. A second end of the first load component is electrically coupled to a forward input end of the voltage comparator. A second end of the second load component, a first end of the capacitor component and a first end of the third load component are electrically coupled to an inverting input end of the voltage comparator, respectively. A second end of the capacitor component and a second end of the third load component are electrically coupled to the ground end, respectively. An output end of the voltage comparator forms the output end of the signal collection circuit.

The first load component, the second load component and the third load component may be, for example, a resistor, and certainly, they may also be other components that can be equivalent to the resistor, which is not limited herein.

The operating principle of the signal collection circuit may include followings.

When the data communication device receives the high level signal through the first communication sub interface, the input end of the signal collection circuit may be applied with the high level signal, after the high level signal passes through the first load component and the second load component, respectively, a voltage drop may be generated. When there is no capacitor and the third load component, the voltage value corresponding to the high level signal of the second end of the first load component may be equal to the voltage value corresponding to the high level signal of the second end of the second load component, and the voltage comparator cannot output the signal normally. Due to the presence of the capacitor and the third load component, the capacitor may performing charging to reach energy balance, the voltage corresponding to the high level signal reaching the second end of the second load component may be pulled down by the third load component and then applied to the inverting input end of the voltage comparator, and the high level signal reaching the second end of the first load component may be directly applied to the forward input end of the voltage comparator. In this case, the voltage value of the forward input end of the voltage comparator may be higher than that of the inverting input end, and the voltage comparator can output the high level signal through the output end. The detection port of the main control chip collects the high level signal outputted through the output end of the voltage comparator, and can know that the data communication device receives the high level signal.

When the data communication device receives the low level signal through the first communication sub interface, the input end of the signal collection circuit may be applied with the low level signal, after the low level signal passes through the first load component and the second load component respectively, when there is no capacitor and the third load component, the voltage value corresponding to the low level signal of the second end of the first load component may be equal to the voltage value corresponding to the low level signal of the second end of the second load component, the voltage comparator cannot output the signal normally. Due to the presence of the capacitor and the third load component, the voltage difference across both ends of the capacitor may be decreased, the capacitor may discharge to reach energy balance, in the case that the capacitor discharges, the low level signal reaching the second end of the second load component may be temporarily increased and then applied to the inverting input end of the voltage comparator, and the low level signal reaching the second end of the first load component may be directly applied to the forward input end of the voltage comparator. In this case, the voltage value of the forward input end of the voltage comparator may be lower than that of the inverting input end, and the voltage comparator can output the low level signal through the output end. The detection port of the main control chip collects the low level signal outputted through the output end of the voltage comparator, and can know that the data communication device receives the low level signal.

It should be noted that, the voltage of the high level signal and the low level signal received by the data communication device through the first communication sub interface is relative. The voltage difference between the voltage value corresponding to the low level signal and the voltage value corresponding to the high level signal may be small. Generally, the detection port of the main control chip cannot directly detect the level change with a small voltage difference, by the signal collection circuit provided in the embodiment, the small voltage difference can be amplified, such that the detection port of the main control chip can achieve detection of the level change with a small voltage difference.

Figure 4:
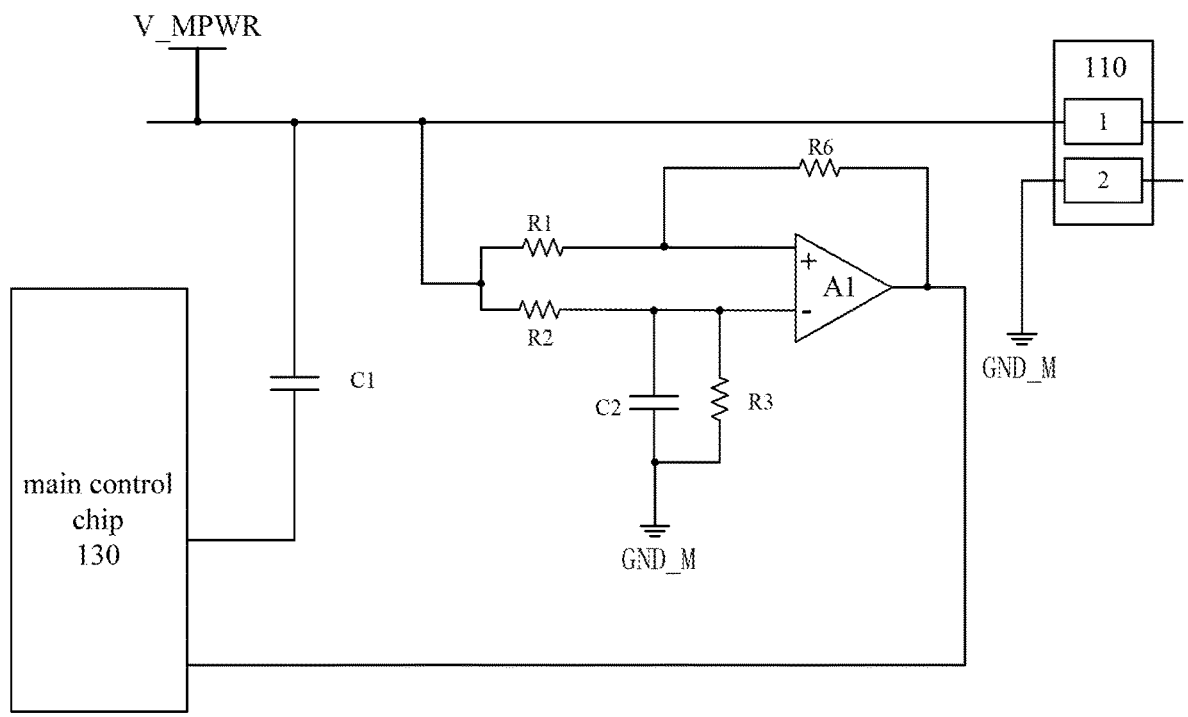
FIG. 4 is yet another schematic diagram of a data communication device configured as a master device according to Embodiment 2 of the present disclosure.

In an alternative implementation of embodiments of the present disclosure, as illustrated in FIG. 4, the data communication device further includes a glitch filter component (R6 shown in FIG. 4). The glitch filter component is coupled between the second end of the first load component and the output end of the voltage comparator.

The glitch filter component may be a resistor, and certainly, it may also be other components that can be equivalent to the resistor, which is not limited herein.

Figure 5:
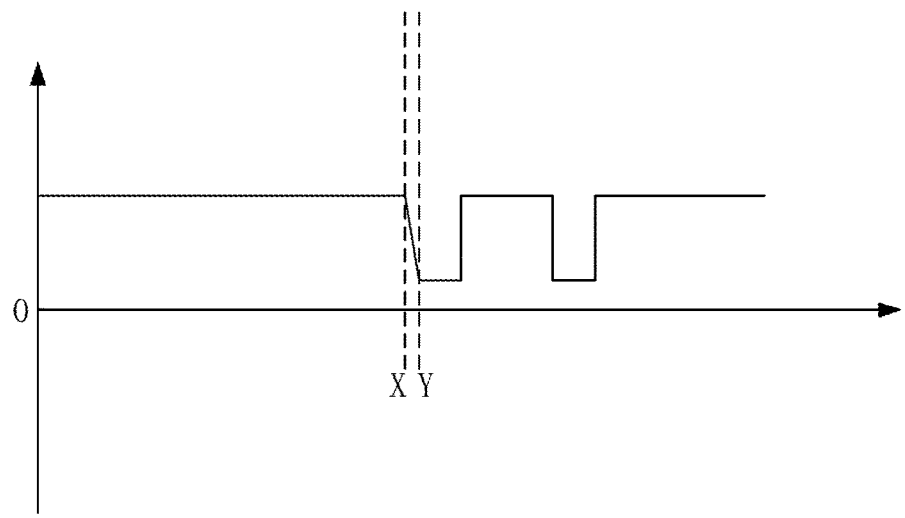
FIG. 5 is a schematic diagram of a signal waveform with a glitch signal according to Embodiment 2 of the present disclosure.

Due to factors such as circuit instability or signal interference, there may be a glitch signal in the level signal applied to the input end of the signal collection circuit, and the glitch signal is generally a low level signal. As shown in FIG. 5, a level signal with a glitch signal is illustrated, the signal between point X and point Y is the glitch signal, and the signal after point Y is the level signal carrying normal data. When no glitch filter component is set, after the low level signal between point X and point Y is applied to the input end of the signal collection circuit, based on the operating principle of the signal collection circuit, it can be seen that, the voltage corresponding to the low level signal reaching the second end of the second load component may be temporarily increased and then applied to the inverting input end of the voltage comparator in the case that the capacitor discharges, and the low level signal reaching the second end of the first load component may be directly applied to the forward input end of the voltage comparator. In this case, the voltage value of the forward input end of the voltage comparator is lower than that of the inverting input end, and the voltage comparator outputs the low level signal through the output end. In this case, the data communication device may consider that the low voltage signal (the signal between point X and point Y) carrying normal data has been received. Actually, the level signal carrying the normal data begins from point Y.

In order to effectively filter the glitch signal, in the embodiment, a glitch filter component is provided in the data communication device. When the low level signal between point X and point Y is applied to the input end of the signal collection circuit, due to the presence of the capacitor and the third load component, the capacitor may discharge to reach energy balance, the voltage corresponding to the low level signal reaching the second of the second load component may be temporarily increased and then applied to the inverting input end of the voltage comparator in the case that the capacitor discharges. Due to the presence of the glitch filter component, the voltage of the output end of the voltage comparator will temporarily and reversely flow to the second end of the first load component, such that the low level signal reaching the second end of the first load component may also be temporarily increased and then applied to the forward input end of the voltage comparator. The temporarily increased voltage that is reversely supplied to the forward input end of the voltage comparator by the output end of the voltage comparator via the glitch filter component may be higher than the voltage supplied to the inverting input end of the voltage comparator by capacitor discharge, in this case, the voltage value of the forward input end of the voltage comparator may be temporarily greater than the voltage value of the inverting input end, and the voltage comparator outputs the high level signal through the output end. The detection port of the main control chip collects the high level signal outputted through the output end of the voltage comparator, and can know that no low level signal carrying normal data is received, that is, the interference caused by the glitch signal is filtered. Since the voltage increase caused by the glitch filter component to the forward input end of the voltage comparator is temporary, the time duration of reversely providing the increased voltage by the output end of the voltage comparator via the glitch filter component is far less than the discharge time duration of the capacitor. Thus, when the low level signal of point Y reaches, the voltage increase brought by the glitch filter component to the forward input end of the voltage comparator has disappeared, and the capacitor continues to discharge, based on the principle of the signal collection circuit, the voltage corresponding to the low level signal reaching the second end of the second load component may be temporarily increased and then applied to the inverting input end of the voltage comparator in the case that the capacitor discharges, and the low level signal reaching the second end of the first load component may be directly applied to the forward input end of the voltage comparator. In this case, the voltage value of the forward input end of the voltage comparator is lower than the voltage value of the inverting input end, and the voltage comparator outputs the low level signal through the output end. The detection port of the main control chip collects the low level signal outputted through the output end of the voltage comparator, and can know that the low level signal carrying normal data is received.

It should be noted that, in embodiments of the present disclosure, the master device may communicate with the slave device in one direction, in other words, they cannot receive data when they send data, and they cannot send data when they receive data. When the master device sends data, the slave device can only receive data and cannot send data. When the master device ends data transmission, the master device may send an instruction instructing end of data transmission to the slave device, the slave device can end receiving data and start transmitting data. In this case, the master device can detect the data sent by the slave device, and the master device can enter a data reception state. Similarly, when the slave device sends data, the master device can only receive data and cannot send data. When the slave device ends data transmission, the slave device may send an instruction instructing end of data transmission to the master device, the master device can end receiving data and start transmitting data. In this case, the slave device can detect the data sent by the master device, and the slave device can enter the data reception state.

Embodiment 3

The embodiment provides a data communication device, which may be configured as a master device. The difference between the data communication device provided in this embodiment and that provided in Embodiment 2 lies in that, in Embodiment 2, the second signal is provided by the control port of the main control chip, and in this embodiment, the second signal is provided by a voltage generating circuit.

Figure 6:
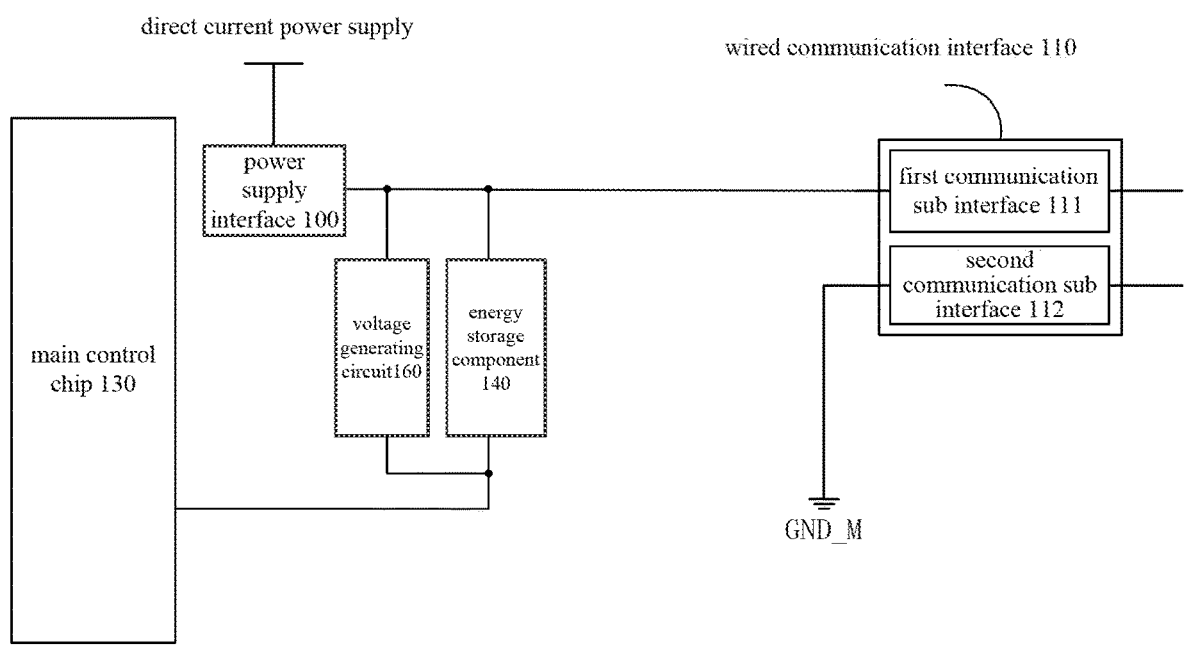
FIG. 6 is a schematic diagram of a data communication device configured as a master device according to Embodiment 3 of the present disclosure.

In this embodiment, as illustrated in FIG. 6, the device further includes a voltage generating circuit 160. The first signal is a level signal having a voltage value less than a second voltage value, and the second voltage value is less than the voltage value at the power supply interface. An input end of the voltage generating circuit 160 is electrically coupled to the power supply interface 100, and an output end of the voltage generating circuit 160 is electrically coupled to the second end of the energy storage component 140. The voltage generating circuit 160 is configured to output a level signal having the voltage value equal to the second voltage value to the second end of the energy storage component.

Figure 7:
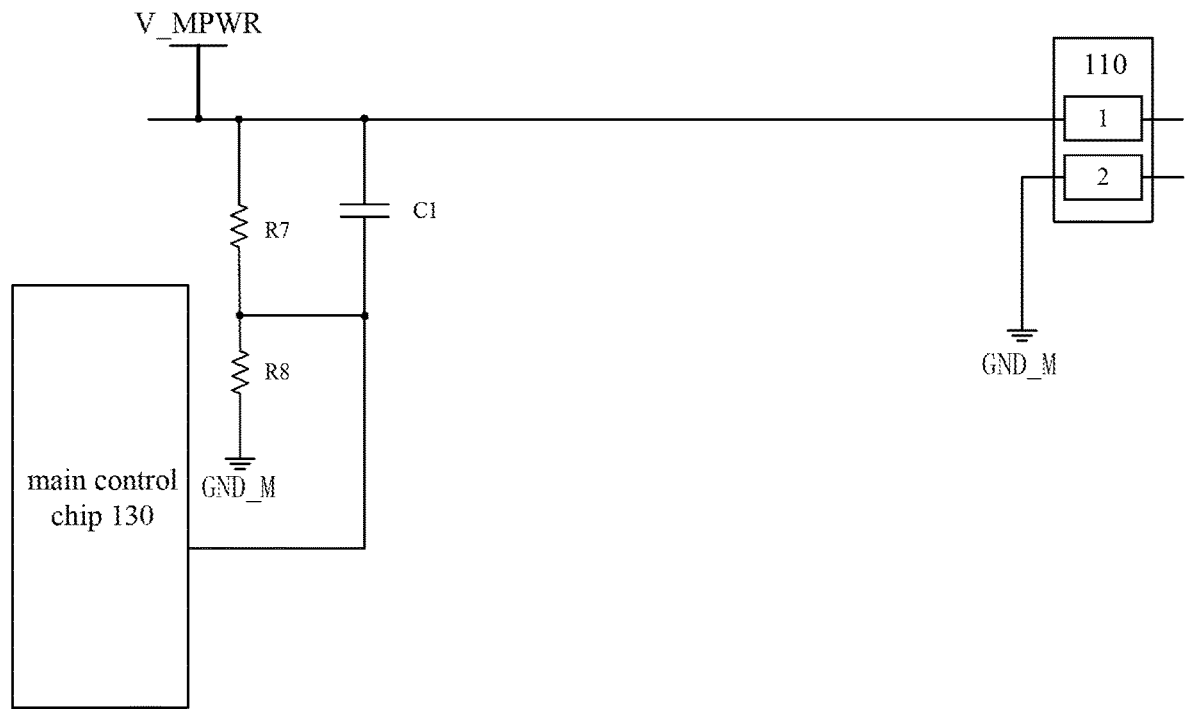
FIG. 7 is another schematic diagram of a data communication device configured as a master device according to Embodiment 3 of the present disclosure.

As illustrated in FIG. 7, the energy storage component may be a capacitor (C1 shown in FIG. 7). A first end of the energy storage component is electrically coupled to the power supply interface 100 and the first communication sub interface (in FIG. 7, 1 in the 110 denotes the first communication sub interface, and 2 in 110 denotes the second communication sub interface), respectively, and the second end of the energy storage component is electrically coupled to the output end of the voltage generating circuit.

When the data communication device sends the high level signal, since the first end of the energy storage component can be maintained at the voltage provided by the power supply interface, the level of the first communication sub interface may also be maintained at the high level signal, and the high level signal is the voltage signal provided by the power supply interface. The voltage generating circuit provides the second signal, such that the voltage value of the level of the second end of the energy storage component can be maintained at the second voltage value. The second signal is the level signal having the voltage value equal to the second voltage value, and the second voltage value is lower than the voltage value at the power supply interface. For example, the voltage value at the power supply interface is 5 v, and the second voltage value may be 3 v. In the embodiment, the second signal may have functions of maintaining the voltage difference across both ends of the energy storage component at a difference between the voltage value of the power supply interface and the second voltage value, when the low level signal needs to be sent next time, and the main control chip outputs the first signal having the voltage value less than the second voltage value through the control port, the voltage difference across both ends of the energy storage component may be increased, causing the capacitor to be charged instantaneously. Based on the characteristics of blocking DC and delivering AC of the capacitor, the level of the first end of the energy storage component is instantaneously pulled down, such that the level of the first communication sub interface is pulled down, thereby achieving transmission of the low level signal.

When the data communication device sends the low level signal, the main control chip may output the first signal through the control port, the first signal is the level signal having the voltage value less than the second voltage value, for example, the second voltage value is 3 v, the voltage value of the first signal may be 2 v, or 1 v, or 0 v, etc., the voltage difference across both ends of the capacitor may be increased, such that the capacitor is instantaneously charged. Based on the characteristics of blocking DC and delivering AC of the capacitor, the level of the first end of the capacitor is instantaneously pulled down, such that the level of the first communication sub interface is pulled down, thereby generating a level change to achieve data transmission. With the capacitor, the voltage value of the level at the first communication sub interface can be controlled to drop to the first voltage value (the first voltage value is non-zero), thereby achieving data transmission, rather than adopting the scheme in the related art to achieve data transmission by grounding the level of the transmit port to zero.

In an alternative implementation of the embodiment, an implementation manner of the control port outputting the first signal may be: generating the first signal internally by the main control chip, and outputting it through the control port. Alternatively, another implementation manner of the control port outputting the first signal may be: the control port controls the second end of the energy storage component to be grounded by controlling on/off of a switch, so as to generate the first signal at the control port. In this case, the device further includes a switch component (not shown). The control port is electrically coupled to the second end of the energy storage component through the switch component. The switch component is electrically coupled to the ground end, and the control port is configured to power on a path between the second end of the energy storage component and the ground end when the data communication device sends the low level signal.

In an alternative implementation of embodiments of the present disclosure, as illustrated in FIG. 7, the voltage generating circuit includes a first voltage dividing component (R7 shown in FIG. 7) and a second voltage dividing component (R8 shown in FIG. 7). A first end of the first voltage dividing component forms the input end of the voltage generating circuit, and a second end of the first voltage dividing component is electrically coupled to a first end of the second voltage dividing component. A connection point between the first voltage dividing component and the second voltage dividing component forms the output end of the voltage generating circuit, and a second end of the second voltage dividing component is electrically coupled to the ground end GND_M.

The first voltage dividing component and the second voltage dividing component may be a resistor. The master device is provided with the first voltage dividing component and the second voltage dividing component, by adjusting the resistance value of each of the first voltage dividing component and the second voltage dividing component, the voltage applied to the voltage generating circuit (i.e., the voltage supplied by the power supply) can be adjusted to a level signal (a second signal) having the second voltage value, so as to be supplied to the second end of the energy storage component.

In an alternative implementation of embodiments of the present disclosure, the data communication device further includes a voltage stabilizing module (not shown). The voltage stabilizing module is coupled between the power supply interface 100 and the input end of the voltage generating circuit. The voltage stabilizing module may be a voltage regulator for regulating the input voltage to a stable voltage and output it, so as to ensure that the voltage generating circuit can be applied with the stable voltage.

Figure 8:
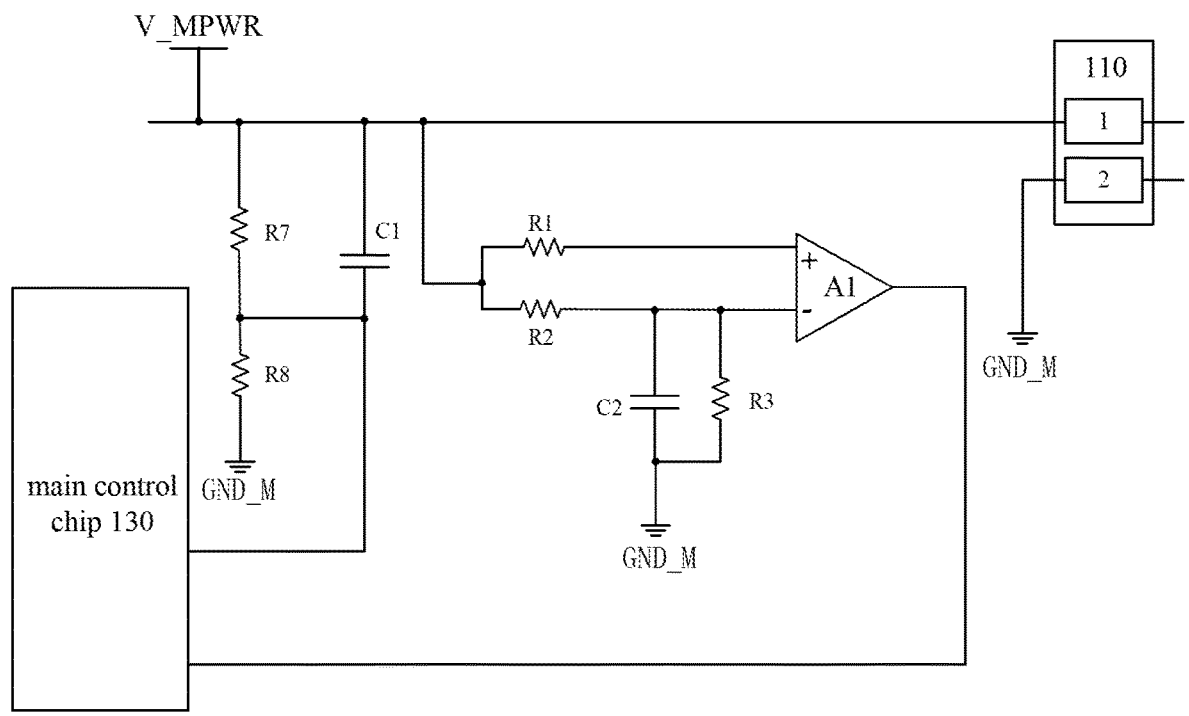
FIG. 8 is yet another schematic diagram of a data communication device configured as a master device according to Embodiment 3 of the present disclosure.

In an alternative implementation of embodiments of the present disclosure, as illustrated in FIG. 8, the signal collection circuit includes a first load component (R1 shown in FIG. 8), a second load component (R2 shown in FIG. 8), a capacitor component (C2 shown in FIG. 8), a third load component (R3 shown in FIG. 8), and a voltage comparator (A1 shown in FIG. 8).

A first end of the first load component is electrically coupled to a first end of the second load component, and a connection point between the first load component and the second load component forms the input end of the signal collection circuit.

A second end of the first load component is electrically coupled to a forward input end of the voltage comparator.

A second end of the second load component, a first end of the capacitor component and a first end of the third load component are electrically coupled to an inverting input end of the voltage comparator, respectively, and a second end of the capacitor component and a second end of the third load component are electrically coupled to the ground end, respectively.

An output end of the voltage comparator forms the output end of the signal collection circuit. The first load component, the second load component and the third load component may be, for example, a resistor, and certainly, they may also be other components that can be equivalent to the resistor, which is not limited herein.

In the embodiment, the function of the signal collection circuit may be similar to that of the signal collection circuit in Embodiment 2, reference may be made to related descriptions of the signal collection circuit in Embodiment 2, and details are not described herein again.

The voltage of the high level signal and the low level signal received by the data communication device through the first communication sub interface is relative. The voltage difference between the voltage value corresponding to the low level signal and that corresponding to the high level signal may be small. Generally, the detection port of the main control chip cannot directly detect the level change with a small voltage difference, by the signal collection circuit provided in the embodiment, the small voltage difference can be amplified, such that the detection port of the main control chip can achieve detection of the level change with a small voltage difference.

Figure 9:
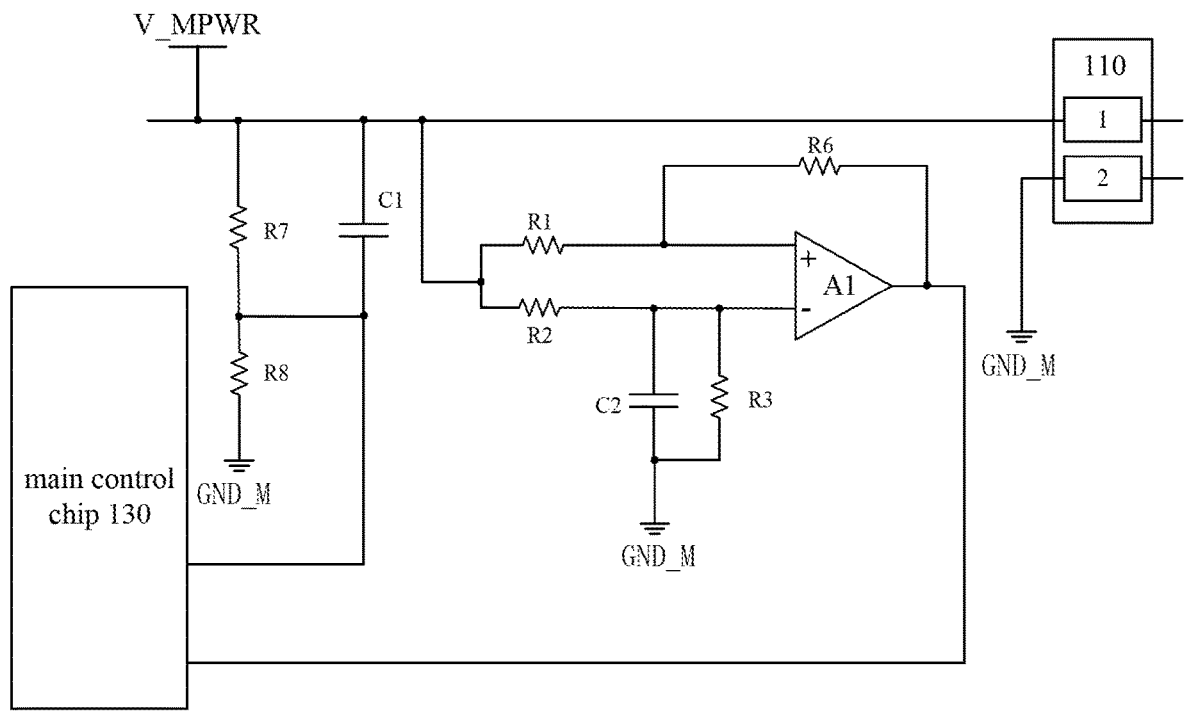
FIG. 9 is still another schematic diagram of a data communication device configured as a master device according to Embodiment 3 of the present disclosure.
Figure 10:
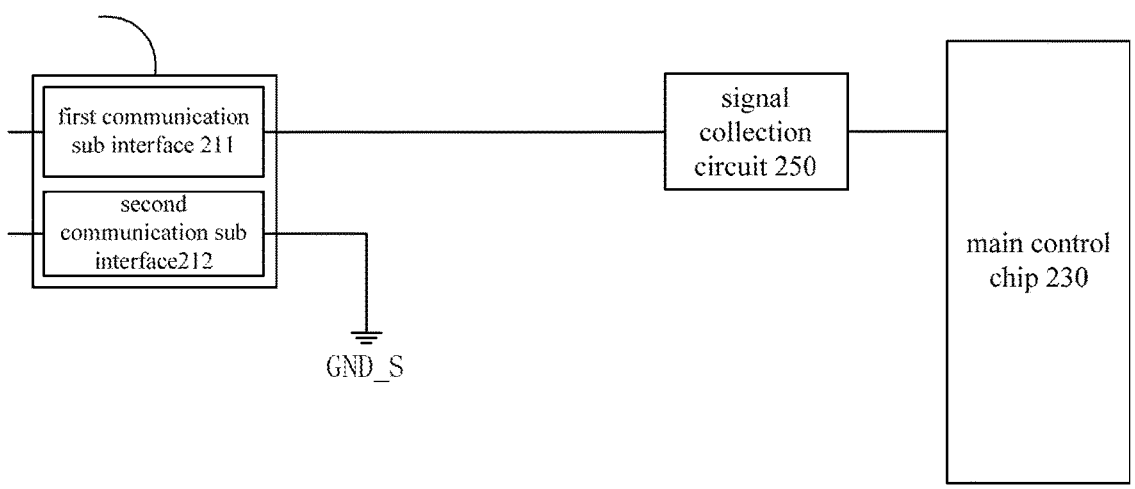
FIG. 10 is a schematic diagram of a data communication device configured as a slave device according to Embodiment 11 of the present disclosure.
Figure 11:
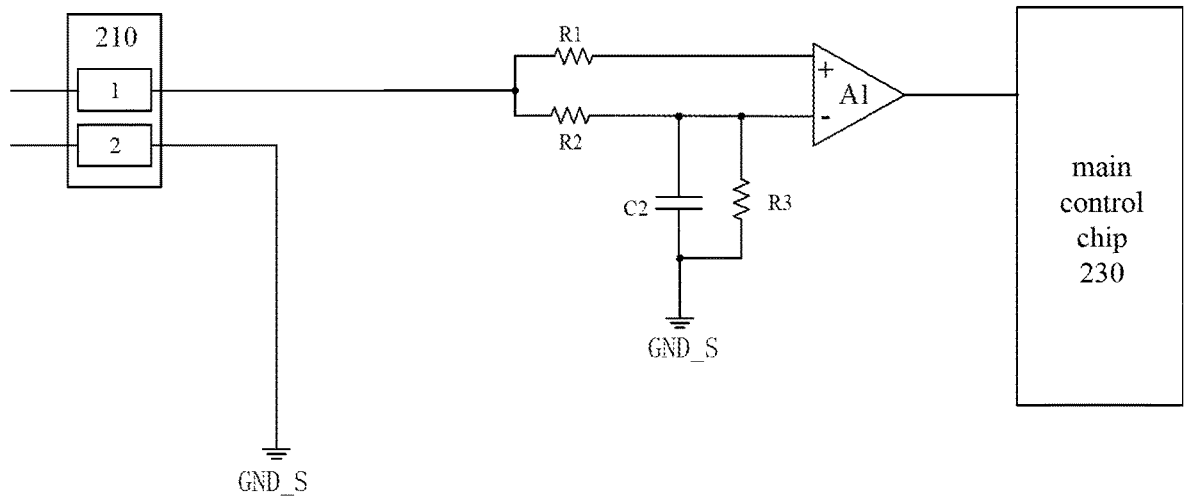
FIG. 11 is another schematic diagram of a data communication device configured as a slave device according to Embodiment 11 of the present disclosure.
Figure 12:
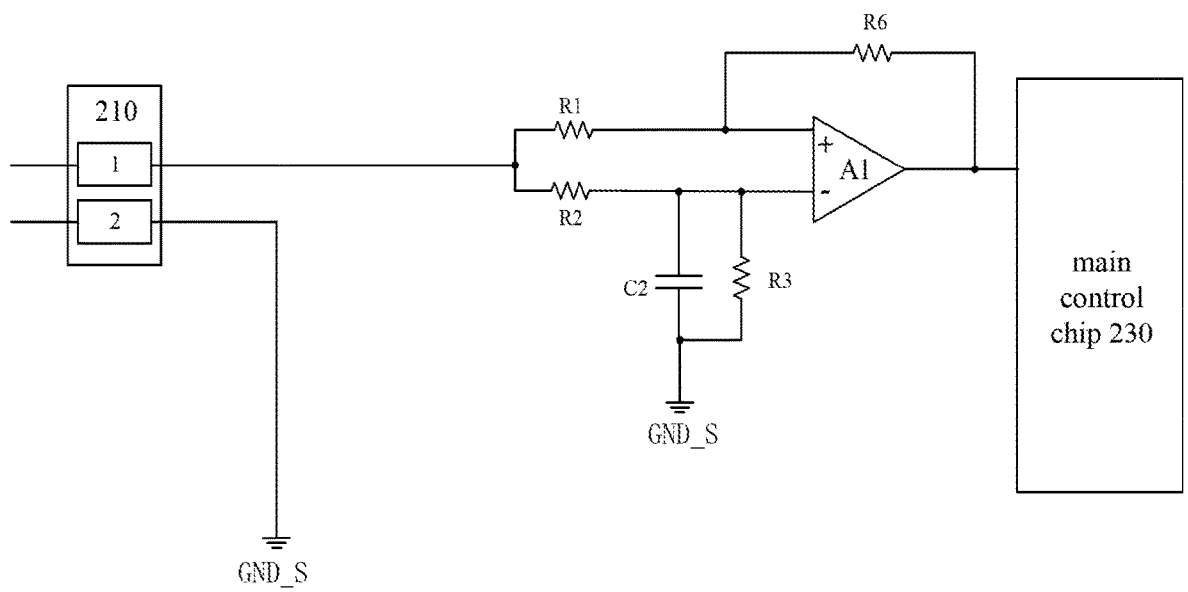
FIG. 12 is yet another schematic diagram of a data communication device configured as a slave device according to Embodiment 11 of the present disclosure.
Figure 13:
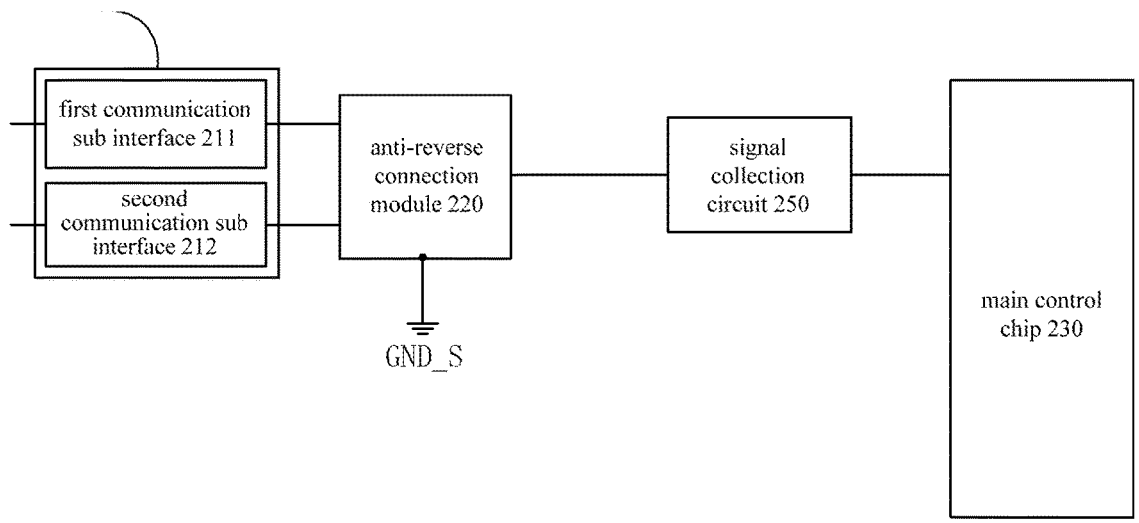
FIG. 13 is a schematic diagram of a data communication device configured as a slave device according to Embodiment 12 of the present disclosure.
Figure 14:
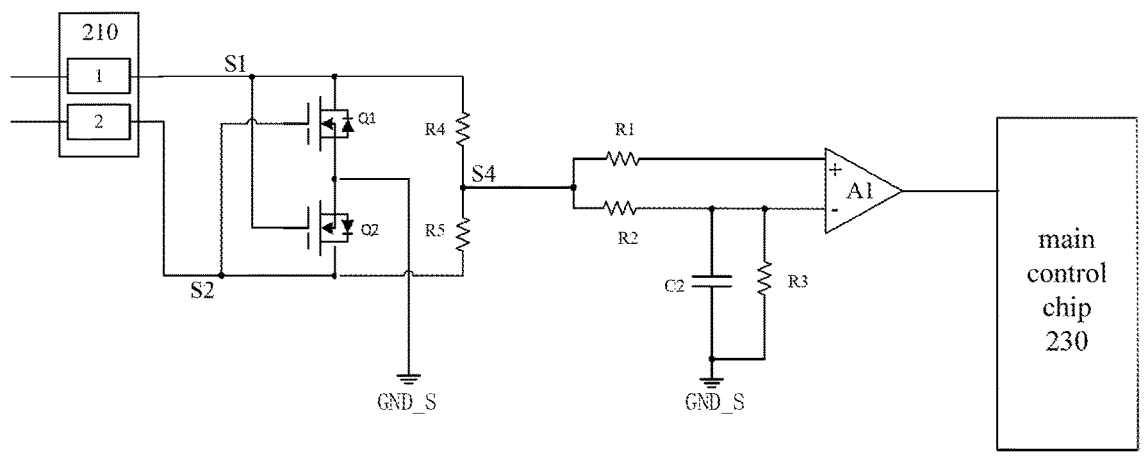
FIG. 14 is another schematic diagram of a signal waveform with a glitch signal according to Embodiment 12 of the present disclosure.
Figure 15:
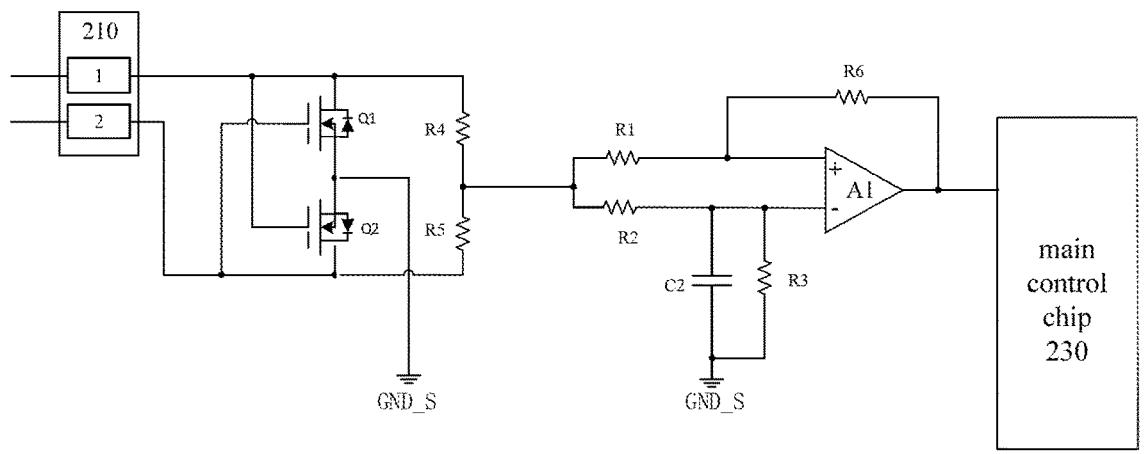
FIG. 15 is yet another schematic diagram of a data communication device configured as a slave device according to Embodiment 12 of the present disclosure.
Figure 16:
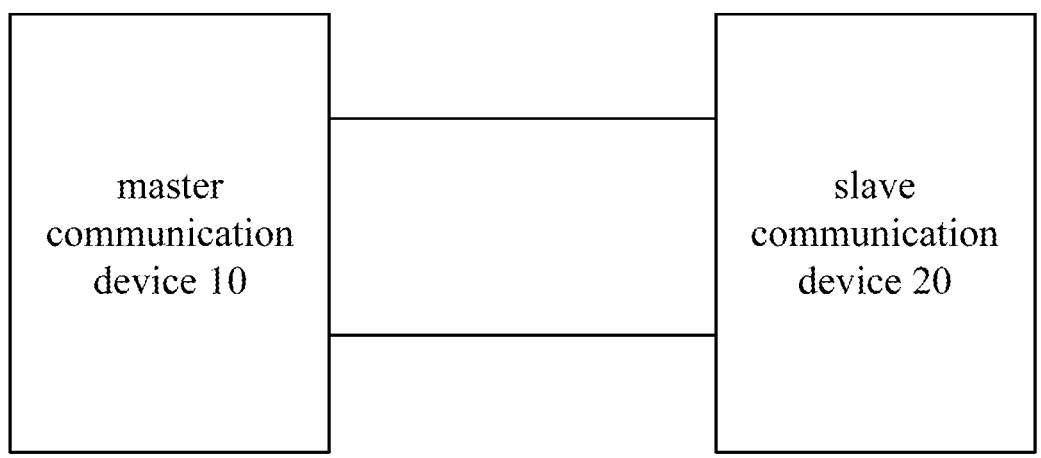
FIG. 16 is a schematic diagram of a data communication system according to Embodiment 13 of the present disclosure.

In an alternative implementation of embodiments of the present disclosure, as illustrated in FIG. 9, the data communication device further includes a glitch filter component (R6 shown in FIG. 9). The glitch filter component is coupled between the second end of the first load component (R1 shown in FIG. 9) and the output end of the voltage comparator (A1 shown in FIG. 9).

The glitch filter component may be a resistor, and certainly, it may also be other components that can be equivalent to the resistor, which is not limited herein.

In the embodiment, the function of the glitch filter component may be similar to that of the glitch filter component in Embodiment 2, reference may be made to related descriptions of the glitch filter component in Embodiment 2, and details are not described herein again.

Embodiment 11

The embodiment provides a data communication device, which may be configured as a slave device.

As illustrated in FIG. 30, the data communication device includes a wired communication interface 210, a main control chip 230 and a signal collection circuit 250.

The wired communication interface 210 includes a first communication sub interface 211 and a second communication sub interface 212.

The second communication sub interface 212 is electrically coupled to a ground end GND_S of the data communication device.

The first communication sub interface 211 is electrically coupled to the input end of the signal collection circuit 250.

The main control chip 230 includes a detection port. The detection port is electrically coupled to an output end of the signal collection circuit 250.

As illustrated in FIG. 31, the signal collection circuit includes a first load component (R1 shown in FIG. 31), a second load component (R2 shown in FIG. 31), a capacitor component (C2 shown in FIG. 31), a third load component (R3 shown in FIG. 31), and a voltage comparator (A1 shown in FIG. 31).

A first end of the first load component is electrically coupled to a first end of the second load component, and a connection point between the first load component and the second load component forms the input end of the signal collection circuit.

A second end of the first load component is electrically coupled to a forward input end of the voltage comparator.

A second end of the second load component, a first end of the capacitor component and a first end of the third load component are electrically coupled to an inverting input end of the voltage comparator, respectively, and a second end of the capacitor component and a second end of the third load component are electrically coupled to the ground end, respectively.

An output end of the voltage comparator forms the output end of the signal collection circuit.

The first load component, the second load component and the third load component may be, for example, a resistor, and certainly, they may also be other components that can be equivalent to the resistor, which is not limited herein.

The operating principle of the signal collection circuit may include followings.

When the data communication device receives the high level signal, the input end of the signal collection circuit may be applied with the high level signal, after the high level signal passes through the first load component and the second load component, a voltage drop may be generated. When there is no capacitor and the third load component, the voltage value corresponding to the high level signal of the second end of the first load component may be equal to the voltage value corresponding to the high level signal of the second end of the second load component, and the voltage comparator cannot output the signal normally. Due to the presence of the capacitor and the third load component, the capacitor may perform charging to reach energy balance, the voltage corresponding to the high level signal reaching the second end of the second load component may be pulled down by the third load component and then applied to the inverting input end of the voltage comparator, and the high level signal reaching the second end of the first load component may be directly applied to the forward input end of the voltage comparator. In this case, the voltage value of the forward input end of the voltage comparator may be higher than the voltage value of the inverting input end, and the voltage comparator can output the high level signal through the output end. The detection port of the main control chip collects the high level signal outputted through the output end of the voltage comparator, and can know that the data communication device receives the high level signal.

When the data communication device receives the low level signal, the input end of the signal collection circuit may be applied with the low level signal, after the low level signal passes through the first load component and the second load component respectively, when there is no capacitor and the third load component, the voltage value corresponding to the low level signal of the second end of the first load component may be equal to the voltage value corresponding to the low level signal of the second end of the second load component, the voltage comparator cannot output the signal normally. Due to the presence of the capacitor and the third load component, the voltage difference across both ends of the capacitor may be decreased, the capacitor may discharge to reach energy balance, in the case that the capacitor discharges, the low level signal reaching the second end of the second load component may be temporarily increased and then applied to the inverting input end of the voltage comparator, and the low level signal reaching the second end of the first load component may be directly applied to the forward input end of the voltage comparator. In this case, the voltage value of the forward input end of the voltage comparator may be lower than that of the inverting input end, and the voltage comparator can output the low level signal through the output end. The detection port of the main control chip collects the low level signal outputted through the output end of the voltage comparator, and can know that the data communication device receives the low level signal.

It should be noted that, the voltage of the high level signal and the low level signal received by the data communication device is relative. The voltage difference between the voltage value corresponding to the low level signal and the voltage value corresponding to the high level signal may be small. Generally, the detection port of the main control chip cannot directly detect the level change with a small voltage difference, by the signal collection circuit provided in the embodiment, the small voltage difference can be amplified, such that the detection port of the main control chip can achieve detection of the level change with a small voltage difference.

In an alternative implementation of the embodiment, as illustrated in FIG. 32, the device further includes a glitch filter component (R6 shown in FIG. 32). The glitch filter component is coupled between the second end of the first load component (R1 shown in FIG. 32) and the output end of the voltage comparator (A1 shown in FIG. 32).

The glitch filter component may be a resistor, and certainly, it may also be other components that can be equivalent to the resistor, which is not limited herein.

For details of the glitch filter component and the glitch signal, reference may be made to related descriptions in Embodiment 3, and details are not described herein again.

In an alternative implementation of the embodiment, the main control chip may further include a power supply port. The power supply port is electrically coupled to the first communication sub interface. The first communication sub interface may be electrically coupled to the power supply port of other load components in the data communication device, so as to supply power to the load components in the data communication device. Alternatively, there is provided with a voltage stabilizing component disposed between the first communication sub interface and the power supply port of the main control chip in the data communication device. The voltage stabilizing component may be configured to eliminate voltage oscillation and output a stable voltage when the power supply voltage provided by the external device is not stable. The voltage stabilizing component may be a capacitor, an end of the capacitor is electrically coupled to the first communication sub interface and the power supply port of the main control chip, and the other end of the capacitor is electrically coupled to the ground end of the data communication device.

In an alternative implementation of the embodiment, the data communication device configured as the slave device can transmit data to the master device, the wired communication interface is configured to connect to an external device (the external device is the master device), so as to supply power to the data communication device by the external device. In an alternative implementation of the embodiment, when the data communication device configured as the slave device transmits data to the master device, the second signal may be provided by a voltage generating circuit. The device may further include the voltage generating circuit. Embodiment 12

The embodiment provides a data communication device, which may be configured as a slave device. In the embodiment, the data communication device is provided with an anti-reverse connection module, which can achieve anti-reverse connection functions by the anti-reverse connection module.

As illustrated in FIG. 33, the data communication device includes a wired communication interface 210, an anti-reverse connection module 220, a main control chip 230, and a signal collection circuit 250.

The wired communication interface 210 includes a first communication sub interface 211 and a second communication sub interface 212.

The first communication sub interface 211 is electrically coupled to a first input/output end of the anti-reverse connection module 220, and the second communication sub interface 212 is electrically coupled to a second input/output end of the anti-reverse connection module 220. A ground end of the anti-reverse connection module 220 is electrically coupled to a ground end GND_S of the data communication device, and an output end of the anti-reverse connection module 220 is electrically coupled to an input end of the signal collection circuit 250.

The anti-reverse connection module 220 is configured to power on a path from one of the first input/output end and the second input/output end to the output end of the anti-reverse connection module, and power on a path from the ground end to the other one of the first input/output end and the second input/output end.

The main control chip 230 includes a detection port, and the detection port is electrically coupled to an output end of the signal collection circuit 250.

As illustrated in FIG. 34, the signal collection circuit includes a first load component (R1 shown in FIG. 34), a second load component (R2 shown in FIG. 34), a capacitor component (C2 shown in FIG. 34), a third load component (R3 shown in FIG. 34), and a voltage comparator (A1 shown in FIG. 34).

A first end of the first load component is electrically coupled to a first end of the second load component, and a connection point between the first load component and the second load component forms the input end of the signal collection circuit.

A second end of the first load component is electrically coupled to a forward input end of the voltage comparator.

A second end of the second load component, a first end of the capacitor component and a first end of the third load component are electrically coupled to an inverting input end of the voltage comparator, respectively, and a second end of the capacitor component and a second end of the third load component are electrically coupled to the ground end, respectively.

An output end of the voltage comparator forms the output end of the signal collection circuit. In actual use, the master device may be coupled to the slave device in a forward direction or in a reverse direction. The forward connection denotes that the first communication sub interface of the master device is coupled to the first communication sub interface of the slave device, and the second communication sub interface of the master device is coupled to the second communication sub interface of the slave device. Conversely, the reverse connection denotes that the first communication sub interface of the master device is coupled to the second communication sub interface of the slave device, and the second communication sub interface of the master device is coupled to the first communication sub interface of the slave device. Normally, when the master device is coupled to the slave device in the forward direction, communication can be performed normally. When the master device is coupled to the slave device in the reverse direction, and the slave device does not support the anti-reverse connection function, the master device cannot communicate with the slave device. In the embodiment, the data communication device that supports the anti-reverse connection function is provided. By the anti-reverse connection module, the path from one of the first communication sub interface and the second communication sub interface to the output end of the anti-reverse connection module can be powered on, and the path from the ground end to the other one of the first communication sub interface and the second communication sub interface can be powered on, whether the master device and the slave device are connected in the forward direction or in the reverse direction, normal data communication can be guaranteed.

The first load component, the second load component and the third load component may be, for example, a resistor, and certainly, they may also be other components that can be equivalent to the resistor, which is not limited herein.

The operating principle of the signal collection circuit may include followings.

When the data communication device receives the high level signal, the input end of the signal collection circuit may be applied with the high level signal, after the high level signal passes through the first load component and the second load component, respectively, a voltage drop may be generated. When there is no capacitor and the third load component, the voltage value corresponding to the high level signal of the second end of the first load component may be equal to the voltage value corresponding to the high level signal of the second end of the second load component, and the voltage comparator cannot output the signal normally. Due to the presence of the capacitor and the third load component, the capacitor may perform charging to reach energy balance, the voltage corresponding to the high level signal reaching the second end of the second load component may be pulled down by the third load component and then applied to the inverting input end of the voltage comparator, and the high level signal reaching the second end of the first load component may be directly applied to the forward input end of the voltage comparator. In this case, the voltage value of the forward input end of the voltage comparator may be higher than the voltage value of the inverting input end, and the voltage comparator can output the high level signal through the output end. The detection port of the main control chip collects the high level signal outputted through the output end of the voltage comparator, and can know that the data communication device receives the high level signal.

When the data communication device receives the low level signal, the input end of the signal collection circuit may be applied with the low level signal, after the low level signal passes through the first load component and the second load component respectively, when there is no capacitor and the third load component, the voltage value corresponding to the low level signal of the second end of the first load component may be equal to the voltage value corresponding to the low level signal of the second end of the second load component, the voltage comparator cannot output the signal normally. Due to the presence of the capacitor and the third load component, the voltage difference across both ends of the capacitor may be decreased, the capacitor may discharge to reach energy balance, in the case that the capacitor discharges, the low level signal reaching the second end of the second load component may be temporarily increased and then applied to the inverting input end of the voltage comparator, and the low level signal reaching the second end of the first load component may be directly applied to the forward input end of the voltage comparator. In this case, the voltage value of the forward input end of the voltage comparator may be lower than that of the inverting input end, and the voltage comparator can output the low level signal through the output end. The detection port of the main control chip collects the low level signal outputted through the output end of the voltage comparator, and can know that the data communication device receives the low level signal.

It should be noted that, the voltage of the high level signal and the low level signal received by the data communication device through the first communication sub interface is relative. The voltage difference between the voltage value corresponding to the low level signal and the voltage value corresponding to the high level signal may be small. Generally, the detection port of the main control chip cannot directly detect the level change with a small voltage difference, by the signal collection circuit provided in the embodiment, the small voltage difference can be amplified, such that the detection port of the main control chip can achieve detection of the level change with a small voltage difference.

In an alternative implementation of the embodiment, the structure of the anti-reverse connection module may be the same as that shown in FIG. 19, and details are not described herein again.

In an alternative implementation of the embodiment, as shown in FIG. 34, in the structure of the anti-reverse connection module, diode D1 is replaced with resistor R4, and diode D2 is replaced with resistor R5. The first input/output end S1 of the anti-reverse connection module is electrically coupled to the first communication sub interface (interface 1 in 210 shown in FIG. 34), the second input/output end S2 of the anti-reverse connection module is electrically coupled to the second communication sub interface (interface 2 in 210 shown in FIG. 34) of the wired communication interface, the ground end S3 of the anti-reverse connection module is electrically coupled to the ground end (GND_S shown in FIG. 34) of the data communication device, and output end S4 of the anti-reverse connection module is electrically coupled to the first end of the energy storage component (C1 shown in FIG. 34) and the input end (the connection point between R1 and R2 shown in FIG. 34) of the signal collection circuit, respectively.

When the slave device is coupled to the master device in the forward direction, the first input/output end of the anti-reverse connection module is applied with the level signal, and the second input/output end of the anti-reverse connection module is electrically coupled to the ground end of the master device through the second communication sub interface of the slave device and the second communication sub interface of the master device. Based on the conduction principle of Negative channel-Metal-Oxide-Semiconductor (NMOS), Q1 is powered off, Q2 is powered on, and the current direction is S1→R4→S4→GND_S→Q2→S2. In addition, since the detection voltage range supported by the signal collection circuit may not match the voltage corresponding to the coupled level signal, the resistor R4 may divide the voltage of the level signal applied to the first communication sub interface, such that level signal of a suitable voltage can be output to the signal collection circuit, thereby ensuring that the signal collection circuit can perform normal signal acquisition.

When the slave device is coupled to the master device in the reverse direction, the first input/output end S1 of the anti-reverse connection module is electrically coupled to the ground end of the master device through the second communication sub interface of the slave device and the second communication sub interface of the master device, and the second input/output end S2 of the anti-reverse connection module is applied with the level signal. Based on the conduction principle of NMOS, Q1 is powered on, Q2 is powered off, and the current direction is S2→R5→S4→GND_S→Q1→S1. In addition, since the detection voltage range supported by the signal collection circuit may not match the voltage corresponding to the level signal coupled, the resistor R5 in FIG. 34 may divide the voltage of the level signal applied to the second communication sub interface, such that the level signal of a suitable voltage can be output to the signal collection circuit, thereby ensuring that the signal collection circuit can perform normal signal acquisition.

As illustrated in FIG. 35, the device further includes a glitch filter component (R6 shown in FIG. 35). The glitch filter component is coupled between the second end of the first load component (R1 shown in FIG. 35) and the output end of the voltage comparator (A1 shown in FIG. 35).

The glitch filter component may be a resistor, and certainly, it may also be other components that can be equivalent to the resistor, which is not limited herein.

In the embodiment, the function of the glitch filter component may be similar to that of the glitch filter component in Embodiment 11, reference may be made to related descriptions of the glitch filter component in Embodiment 11, and details are not described herein again.

In an alternative implementation of the embodiment, the main control chip may include a power supply port. The power supply port is electrically coupled to the output end of the anti-reverse connection module.

In an alternative implementation of the embodiment, the output end of the anti-reverse connection module 220 may also be electrically coupled to the power supply port of other load components in the data communication device, so as to supply power to the load components in the data communication device.

Alternatively, there is provided with a voltage stabilizing component disposed between the output end of the anti-reverse connection module 220 and the power supply port of the main control chip. The voltage stabilizing component may be configured to eliminate voltage oscillation and output a stable voltage when the power supply voltage received by the slave device from the external device is not stable. The voltage stabilizing component may be a capacitor, an end of the capacitor is electrically coupled to the output end of the anti-reverse connection module 220 and the power supply port of the main control chip, respectively, and the other end of the capacitor is electrically coupled to the ground end of the data communication device.

In an alternative implementation of the embodiment, the data communication device configured as the slave device can transmit data to the master device, the wired communication interface is configured to connect to an external device, so as to supply power to the data communication device by the external device. In an alternative implementation of the embodiment, the data communication device configured as the slave device can transmit data to the master device, the second signal may be provided by the voltage generating circuit. The device may further include a voltage generating circuit. Embodiment 13

The embodiment provides a data communication system.

FIG. 36 is a schematic diagram of a data communication system according to the embodiment, as illustrated in FIG. 36, the data communication system in the embodiment includes a master communication device 10 and a slave communication device 20. As illustrated in FIG. 36, in the embodiment, the master communication device 10 may communicate with the slave communication device 20 via a two-wire communication interface. When the master communication device 10 is coupled to the slave communication device 20 in a forward direction via the two-wire communication interface, it indicates that a first communication sub interface of the master communication device 10 is electrically coupled to a first communication sub interface of the slave communication device 20, and a second communication sub interface of the master communication device 10 is electrically coupled to a second communication sub interface of the slave communication device 20. The master communication device 10 can transmit data to the slave communication device 20 through its first communication sub interface, and the slave communication device 20 can detect the data transmitted by the master communication device 10 through its first communication sub interface. Additionally, the slave communication device 20 can transmit data to the master communication device 10 through first communication sub interface, and the master communication device 10 can detect the data transmitted by the slave communication device 20 through its first communication sub interface. Conversely, when the master communication device 10 is coupled to the slave communication device 20 in a reverse direction via the two-wire communication interface, it indicates that the first communication sub interface of the master communication device 10 is coupled to the second communication sub interface of the slave communication device 20, and the second communication sub interface of the master communication device 10 is coupled to the first communication sub interface of the slave communication device 20. The master communication device 10 can transmit data to the slave communication device 20 through its first communication sub interface, and the slave communication device 20 can detect the data transmitted by the master communication device 10 through its second communication sub interface. Additionally, the slave communication device 20 can transmit data to the master communication device 10 through its second communication sub interface, and the master communication device 10 can detect the data transmitted by the slave communication device 20 through its first communication sub interface.

In addition, the master communication device 10 may supply power to the slave communication device 20 through the first communication sub interface of the master communication device 10.

In the data communication system provided in the embodiment, in the communication process, the first wired communication interface of the master communication device 10 is coupled to the second wired communication interface of the slave communication device 20 through wire. The master communication device 10 can transmit data by changing the level at the first communication sub interface of the master communication device 10, since the first communication sub interface of the master communication device 10 is electrically coupled to one of the communication sub interfaces of the slave communication device 20, the level change at the first communication sub interface of the master communication device 10 can cause the level change of the communication sub interface (the communication sub interface is one of the two communication sub interfaces of the slave communication device 20) coupled to the first communication sub interface of the master communication device, the slave communication device 20 can detect the data transmitted by the master communication device 10 by detecting the level change of the communication sub interface coupled to the first communication sub interface of the master communication device.

The slave communication device 20 can transmit data by changing the level at the communication sub interface coupled to the first communication sub interface of the master communication device, since the communication sub interface of the slave communication device 20 is electrically coupled to the first communication sub interface of the master communication device 10, the level change at the communication sub interface of the slave communication device 20 may cause the level change of the first communication sub interface of the slave communication device 10, the master communication device 10 can detect the data transmitted by the slave communication device 20 by the level change of the first communication sub interface, thereby achieving data transmission.

In an alternative implementation of the embodiment, the master communication device 10 may adopt the structures described in each of Embodiments 1-3 and details are similar to the descriptions in Embodiments 1-3, the slave communication device 20 may adopt the structures described in each of Embodiments 11-12 and details are similar to the descriptions in Embodiments 11-12, and details are not described herein again. The master communication device described in any one of the Embodiments 1-3 can be combined with the slave communication device described in any one of the Embodiments 11-12, to obtain the data communication system provided by the embodiment.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. The appearances of the phrases such as "in some embodiments," "in one embodiment", "in an embodiment", "in another example," "in an example," "in a specific example," or "in some examples," in the specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by persons of ordinary skill in the art that the above embodiments cannot be construed to limit the present disclosure, and changes, alternatives, and modifications can be made in the embodiments without departing from scope of the present disclosure. The scope of the present disclosure is defined by the appended claims and their equivalents.

What is claimed is:

1. A data communication device configured as a master device, comprising: a power supply interface coupled to a direct current power supply, a wired communication interface, a main control chip, and an energy storage component; wherein,
   the wired communication interface comprises a first communication sub interface and a second communication sub interface;
   the power supply interface is electrically coupled to a first end of the energy storage component and the first communication sub interface, respectively;
   the first communication sub interface is electrically coupled to the first end of the energy storage component;
   the second communication sub interface is electrically coupled to a ground end of the data communication device;
   the main control chip comprises: a control port, electrically coupled to a second end of the energy storage component;
   the main control chip is configured to output a first signal through the control port when the data communication device sends a low level signal;
   the energy storage component is configured to set a voltage of the first end of the energy storage component as a first voltage value under control of the first signal, wherein the first voltage value is less than a voltage value at the power supply interface and greater than zero.

2. The data communication device according to claim 1, wherein,
   the energy storage component is a capacitor;
   the first signal is a level signal having a voltage value less than a second voltage value, wherein the second voltage value is less than the voltage value at the power supply interface;
   the main control chip is further configured to output a second signal through the control port when the data communication device sends a high level signal, wherein the second signal is a level signal having a voltage value equal to the second voltage value.

3. The data communication device according to claim 1, further comprising: a voltage generating circuit, wherein,
   the energy storage component is a capacitor;
   the first signal is a level signal having a voltage value less than a second voltage value, wherein the second voltage value is less than the voltage value at the power supply interface;

an input end of the voltage generating circuit is electrically coupled to the power supply interface, and an output end of the voltage generating circuit is electrically coupled to the second end of the energy storage component, the voltage generating circuit is configured to output a level signal having a voltage value equal to the second voltage value to the second end of the energy storage component.

4. The data communication device according to claim 3, wherein the voltage generating circuit comprises a first voltage dividing component and a second voltage dividing component,
a first end of the first voltage dividing component forms the input end of the voltage generating circuit, and a second end of the first voltage dividing component is electrically coupled to a first end of the second voltage dividing component,
a connection point between the first voltage dividing component and the second voltage dividing component forms the output end of the voltage generating circuit, and a second end of the second voltage dividing component is electrically coupled to the ground end; and
the data communication device further comprises:
a voltage stabilizing module, coupled between the power supply interface and the input end of the voltage generating circuit.

5. The data communication device according to claim 1, further comprising: a switch component; wherein,
the control port is electrically coupled to the second end of the energy storage component through the switch component,
the switch component is electrically coupled to the ground end,
the control port is configured to power on a path between the second end of the energy storage component and the ground end when the data communication device sends the low level signal.

6. The data communication device according to claim 1, further comprising: a signal collection circuit; wherein,
the first communication sub interface is electrically coupled to an input end of the signal collection circuit;
the main control chip further comprises: a detection port which is electrically coupled to an output end of the signal collection circuit;
the signal collection circuit comprises a first load component, a second load component, a capacitor component, a third load component, and a voltage comparator;
a first end of the first load component is electrically coupled to a first end of the second load component, and a connection point between the first load component and the second load component forms the input end of the signal collection circuit;
a second end of the first load component is electrically coupled to a forward input end of the voltage comparator;
a second end of the second load component, a first end of the capacitor component and a first end of the third load component are electrically coupled to an inverting input end of the voltage comparator, respectively;
a second end of the capacitor component and a second end of the third load component are electrically coupled to the ground end, respectively;
an output end of the voltage comparator forms the output end of the signal collection circuit.

7. The data communication device according to claim 6, further comprising:

a glitch filter component, coupled between the second end of the first load component and the output end of the voltage comparator.

8. A data communication device configured as a slave device, comprising: a wired communication interface, an anti-reverse connection module, a main control chip, and a signal collection circuit; wherein,
the wired communication interface comprises a first communication sub interface and a second communication sub interface;
the first communication sub interface is electrically coupled to a first input/output end of the anti-reverse connection module, and the second communication sub interface is electrically coupled to a second input/output end of the anti-reverse connection module,
a ground end of the anti-reverse connection module is electrically coupled to a ground end of the data communication device, and an output end of the anti-reverse connection module is electrically coupled to an input end of the signal collection circuit;
the main control chip comprises: a detection port, electrically coupled to an output end of the signal collection circuit;
the signal collection circuit comprises: a first load component, a second load component, a capacitor component, a third load component, and a voltage comparator;
a first end of the first load component is electrically coupled to a first end of the second load component, and a connection point between the first load component and the second load component forms the input end of the signal collection circuit;
a second end of the first load component is electrically coupled to a forward input end of the voltage comparator;
a second end of the second load component, a first end of the capacitor component and a first end of the third load component are electrically coupled to an inverting input end of the voltage comparator, respectively;
a second end of the capacitor component and a second end of the third load component are electrically coupled to the ground end, respectively;
an output end of the voltage comparator forms the output end of the signal collection circuit;
the anti-reverse connection module is configured to power on a path from one of the first input/output end and the second input/output end to the output end of the anti-reverse connection module, and power on a path from the ground end to the other one of the first input/output end and the second input/output end.

9. The data communication device according to claim 8, further comprising:
a glitch filter component, coupled between the second end of the first load component and the output end of the voltage comparator.

10. The data communication device according to claim 8, wherein the main control chip further comprises:
a power supply port, electrically coupled to the output end of the anti-reverse connection module.

11. The data communication device according to claim 8, wherein the wired communication interface is configured to connect to an external device, so as to supply power to the data communication device by the external device;
wherein the data communication device further comprises: an energy storage component;
the output end of the anti-reverse connection module is electrically coupled to a first end of the energy storage component;

the main control chip comprises: a control port, electrically coupled to a second end of the energy storage component;

the main control chip is configured to output a first signal through the control port when the data communication device sends a low level signal;

the energy storage component is configured to set a voltage of the first end of the energy storage component as a first voltage value under control of the first signal, wherein the first voltage value is less than a voltage value of power supply voltage provided by the external device and greater than zero.

12. The data communication device according to claim 11, wherein the energy storage component is a capacitor;

the first signal is a level signal having a voltage value less than a second voltage value, wherein the second voltage value is less than the voltage value of the power supply voltage provided by the external device;

the main control chip is further configured to output a second signal through the control port when the data communication device sends a high level signal, wherein the second signal is a level signal having a voltage value equal to the second voltage value.

13. The data communication device according to claim 11, further comprising:

a voltage generating circuit;

wherein the energy storage component is a capacitor;

the first signal is a level signal having a voltage value less than a second voltage value, wherein the second voltage value is less than the voltage value of the power supply voltage provided by the external device;

an input end of the voltage generating circuit is electrically coupled to first communication sub interface, and an output end of the voltage generating circuit is electrically coupled to the second end of the energy storage component, the voltage generating circuit is configured to output a level signal having a voltage value equal to the second voltage value to the second end of the energy storage component.

14. The data communication device according to claim 13, wherein the voltage generating circuit comprises a first voltage dividing component and a second voltage dividing component, a first end of the first voltage dividing component forms the input end of the voltage generating circuit, and a second end of the first voltage dividing component is electrically coupled to a first end of the second voltage dividing component, a connection point between the first voltage dividing component and the second voltage dividing component forms the output end of the voltage generating circuit, and a second end of the second voltage dividing component is electrically coupled to the ground end.

15. A data communication system, comprising:

a master communication device; and a slave communication device, wherein the master communication device comprises: a power supply interface coupled to a direct current power supply, a first wired communication interface, a first energy storage component, and a first main control chip;

wherein the first wired communication interface comprises: a first communication sub interface and a second communication sub interface, the first communication sub interface is electrically coupled to the power supply interface, and the second communication sub interface is electrically coupled to a ground end of the master communication device, a first end of the first energy storage component is electrically coupled to a connection point between the first communication sub interface and the power supply interface, the first main control chip comprises: a control port which is electrically coupled to a second end of the first energy storage component, wherein the first main control chip is configured to output a first signal through the control port when the master communication device sends a low level signal, the first energy storage component is configured to set a voltage of the first end of the first energy storage component to a first voltage value under control of the first signal, wherein the first voltage value is less than a voltage value at the power supply interface and greater than zero;

wherein the slave communication device comprises: a second wired communication interface, an anti-reverse connection module, a second main control chip, and a signal collection circuit;

wherein the second wired communication interface comprises: a first communication sub interface of the slave communication device and a second communication sub interface of the slave communication device, wherein the anti-reverse connection module comprises: a first input/output end, a second input/output end, a ground end, and an output end, the first input/output end is electrically coupled to the first communication sub interface of the slave communication device, the second input/output end is electrically coupled to the second communication sub interface of the slave communication device, the ground end is electrically coupled to a ground end of the slave communication device, the output end of the anti-reverse connection module is electrically coupled to an input end of the signal collection circuit, the anti-reverse connection module is configured to power on a path from one of the first input/output end and the second input/output end to the output end of the anti-reverse connection module, and power on a path from the ground end to the other one of the first input/output end and the second input/output end, the second main control chip includes a detection port, and the detection port is electrically coupled to an output end of the signal collection circuit, wherein the signal collection circuit comprises: a first load component, a second load component, a capacitor component, a third load component, and a voltage comparator, wherein a first end of the first load component is electrically coupled to a first end of the second load component, and a connection point between the first load component and the second load component forms the input end of the signal collection circuit, a second end of the first load component is electrically coupled to a forward input end of the voltage comparator, a second end of the second load component, a first end of the capacitor component and a first end of the third load component are electrically coupled to an inverting input end of the voltage comparator, respectively, a second end of the capacitor component and a second end of the third load component are electrically coupled to the ground end, respectively, and an output end of the voltage comparator forms the output end of the signal collection circuit.

\* \* \* \* \*